No. 761,641. Patented June 7, 1904.

UNITED STATES PATENT OFFICE.

GEORGE F. ATWOOD, OF WAKEFIELD, MASSACHUSETTS, ASSIGNOR TO PRIMARY POWER COMPANY, OF WAKEFIELD, MASSACHUSETTS.

EXCITING FLUID FOR ELECTRICAL BATTERIES.

SPECIFICATION forming part of Letters Patent No. 761,641, dated June 7, 1904.

Application filed October 3, 1903. Serial No. 175,607. (No specimens.)

*To all whom it may concern:*

Be it known that I, GEORGE F. ATWOOD, a citizen of the United States, residing at Wakefield, in the county of Middlesex and State of Massachusetts, have invented new and useful Improvements in Composition for Exciting Fluids for Electric Batteries, of which the following is a specification.

My invention relates to a composition for use in the cell of electrical batteries in which the negative electrode is immersed. It is especially adapted for use in batteries of the Bunsen type, and its great value resides in its economy and efficiency. The electrode immersed in the composition is preferably zinc.

In preparing the solution in which the zinc electrode is to be immersed I take thirty gallons of water and add to it sulfuric acid until its specific gravity is 1.2. After cooling I mix therewith one and one-half pounds of ammonium carbonate, ten ounces of carbonate of sodium, and ten ounces of bisulfate of mercury. This solution is then diluted with six parts of water and is ready for use. The addition of the carbonates of ammonium and sodium to the sulfuric acid forms, respectively, sulfate of ammonium and sulfate of sodium. It is obvious, therefore, that corresponding proportions of these salts might be added to the sulfuric acid direct.

I am not the first to use, broadly, the ingredients above described; but I am the first to use the specific proportions mentioned, and these I find give superior results.

Having described my invention, what I claim is—

A composition for use in the cell of electrical batteries in which the negative or zinc element is immersed, consisting of ammonium carbonate one and one-half pounds, carbonate of sodium ten ounces, bisulfate of mercury ten ounces, and sufficient sulfuric acid to make the specific gravity of thirty gallons of water 1.2, as specified.

In testimony whereof I have hereunto set my hand in presence of two subscribing witnesses.

GEORGE F. ATWOOD.

Witnesses:
THOMAS E. TURPIN,
N. C. HEALY.